US009481561B2

(12) United States Patent
Carrara

(10) Patent No.: US 9,481,561 B2
(45) Date of Patent: Nov. 1, 2016

(54) DISPENSING DEVICE FOR A LIQUID FILLING MACHINE

(75) Inventor: Marco Carrara, Bologna (IT)

(73) Assignee: AZIONARIA COSTRUZIONI MACCHINE AUTOMATICHE A.C.M.A. S.P.A. (IT)

( * ) Notice: Subject to any disclaimer, the term of this patent is extended or adjusted under 35 U.S.C. 154(b) by 269 days.

(21) Appl. No.: 13/992,544

(22) PCT Filed: Nov. 30, 2011

(86) PCT No.: PCT/IB2011/055373
§ 371 (c)(1),
(2), (4) Date: Aug. 5, 2013

(87) PCT Pub. No.: WO2012/085717
PCT Pub. Date: Jun. 28, 2012

(65) Prior Publication Data
US 2013/0319579 A1   Dec. 5, 2013

(30) Foreign Application Priority Data

Dec. 22, 2010   (IT) ............... BO2010A0752

(51) Int. Cl.
*B67D 7/32* (2010.01)
*B67C 3/26* (2006.01)
*B67C 3/00* (2006.01)

(52) U.S. Cl.
CPC ............ *B67D 7/3245* (2013.01); *B67C 3/007* (2013.01); *B67C 3/26* (2013.01)

(58) Field of Classification Search
CPC .................. B67D 7/3248; B67C 3/007
USPC ................................. 141/264, 48
See application file for complete search history.

(56) References Cited

U.S. PATENT DOCUMENTS

| 4,721,941 | A  | * | 1/1988  | Robine et al. ............ 340/450.3 |
| 7,325,578 | B2 |   | 2/2008  | De Antoni Migliorati et al. |
| 8,109,299 | B2 |   | 2/2012  | Lupi et al. |
| 2005/0217753 | A1 |   | 10/2005 | Krulitsch et al. |
| 2009/0100799 | A1 | * | 4/2009  | Lupi et al. ................... 53/266.1 |

FOREIGN PATENT DOCUMENTS

| CN | 1460087 A    | 12/2003 |
| CN | 101228088 A  | 7/2008  |
| EP | 1731478      | 12/2006 |
| EP | 1762538      | 3/2007  |
| WO | 2007/016958  | 2/2007  |

OTHER PUBLICATIONS

International Search Report dated Feb. 28, 2012 from counterpart application.

* cited by examiner

*Primary Examiner* — Mark A Laurenzi
*Assistant Examiner* — James Hakomaki
(74) *Attorney, Agent, or Firm* — Timothy J. Klima; Shuttleworth & Ingersoll, PLC

(57) ABSTRACT

Described is a dispensing device for a liquid product filling machine comprising a plurality of the dispensing devices. Each dispensing device comprises a dispensing conduit having a product outlet opening, a shutter for the outlet opening, an actuating unit adapted to move the shutter from a closed position to an open position of the outlet opening and vice versa, a flexible membrane which separates the dispensing conduit from the actuating unit, a product presence detector, indicating when the flexible membrane is broken and connected to a control unit which each dispensing device is equipped with in such a way as to stop dispensing the product from the dispensing device whose flexible membrane is broken.

4 Claims, 4 Drawing Sheets

DISPENSING DEVICE FOR A LIQUID FILLING MACHINE

This application is the National Phase of International Application PCT/182011/055373 filed Nov. 30, 2011 which designated the U.S. and that International Application was published under PCT Article 21(2) in English.

This application claims priority to Italian Patent Application No. BO2010A000752 filed Dec. 22, 2010, which application is incorporated by reference herein.

TECHNICAL FIELD

This invention relates to a dispensing device for a liquid product filling machine.

This invention is applicable in particular to machines for filling containers with liquid and semi-liquid products such as, for example, milk, fruit juices, oil, honey, detergents or the like.

BACKGROUND ART

Prior art filling machines comprise a rotary carousel equipped with a plurality of peripheral holders for supporting the individual containers to be filled.

Each holder is provided with a dispensing device designed to fill the respective container with a certain amount of product from a containment tank.

Prior art dispensing devices consist of a hollow housing extending along a vertical axis, a shutter mounted inside the housing and an actuating unit adapted to move the shutter within the housing.

The hollow housing of the dispenser partly defines a dispensing conduit. The dispensing conduit has an inlet opening and an outlet opening for the product. From the containment tank the product flows through the inlet opening into the dispensing conduit and from there through the outlet opening into the containers to be filled.

The shutter allows the outlet opening of the dispensing conduit to be opened and closed. More specifically, by moving the shutter axially, the actuating unit controls the opening and closing of the outlet opening.

The shutter actuating unit is sealed off from the dispensing conduit by a flexible membrane. More specifically, the membrane connects the shutter with the hollow housing of the dispenser because the shutter itself goes through the membrane.

The membrane guarantees art aseptic environment inside the dispensing conduit by preventing the product to be filled into the containers from being contaminated by external agents from the actuating unit.

During opening and closing of the dispensers outlet opening, the axial movement of the shutter subjects the membrane connected to it to constant bending and hence mechanical stress. Moreover, hot and/or aggressive liquid substances that flow through the dispensing conduit, for example when the dispenser s cleaned, subject the dispenser to further stress.

Usually, the membrane undergoes preventive maintenance because it has a limited theoretical working life, corresponding to a defined number of working cycles, normally indicated by the manufacturer. However, all the stresses the membrane is subjected to may cause it to break before the end of its theoretical working life, allowing the product to come into contact with external contaminating agents.

It is therefore important to detect a broken membrane promptly so that the quality of the product filled into the containers is maintained and guaranteed for the consumer.

One prior art solution for detecting when the flexible membrane breaks comprises providing a sealed chamber adjacent to the membrane inside the dispenser housing, with a connecting conduit which places the sealed chamber in communication with the external environment. A window made on the outside wall of the dispenser allows visual inspection of the connecting conduit. The presence of product in the conduit indicates that the membrane is broken because it has allowed product to flow into the sealed chamber adjacent to it and from there into the connecting conduit in communication with the inspection window.

The visual inspection is performed by an operator who, after detecting the presence of the product in the conduit, must stop the filling machine and carry out the appropriate maintenance.

The visual inspection may be carried out with a certain delay after the membrane has actually broken, making this detection system unreliable.

Moreover, added to the costs of machine maintenance are the costs of non-production due to machine down time needed to carry out the maintenance.

In other prior art solutions, there are sensors for automatically detecting broken membranes. The sensors are connected to a control system which communicates with the filling machine in such a way as to stop the filling machine immediately after detecting the broken membrane, thus allowing the operator to carry out the necessary maintenance.

The systems with automatic sensors are more reliable than those which depend on visual inspection but continue to entail machine down time for maintenance of the dispensing device, resulting in costs arising out of non-production.

DISCLOSURE OF THE INVENTION

This invention has for an aim to propose a dispensing device for a liquid product filling machine which overcomes the above mentioned disadvantages of the prior art.

More specifically, the aim of this invention is to provide a dispensing device equipped with an automatic broken membrane detector which makes it possible to stop only the dispensing device with the broken membrane, and not the entire filling machine, allowing the filling machine to operate at partial capacity.

A further aim of the invention is to provide a dispensing device equipped with a broken membrane detector which is reliable, simple to construct and allows costs to be limited.

This invention accordingly provides a dispensing device for a liquid product filling machine in accordance with the present description.

BRIEF DESCRIPTION OF THE DRAWINGS

The invention will now be described with reference to the accompanying drawings which illustrate a preferred embodiment of it and in which.

DETAILED DESCRIPTION OF THE PREFERRED EMBODIMENTS OF THE INVENTION

Figure 1:
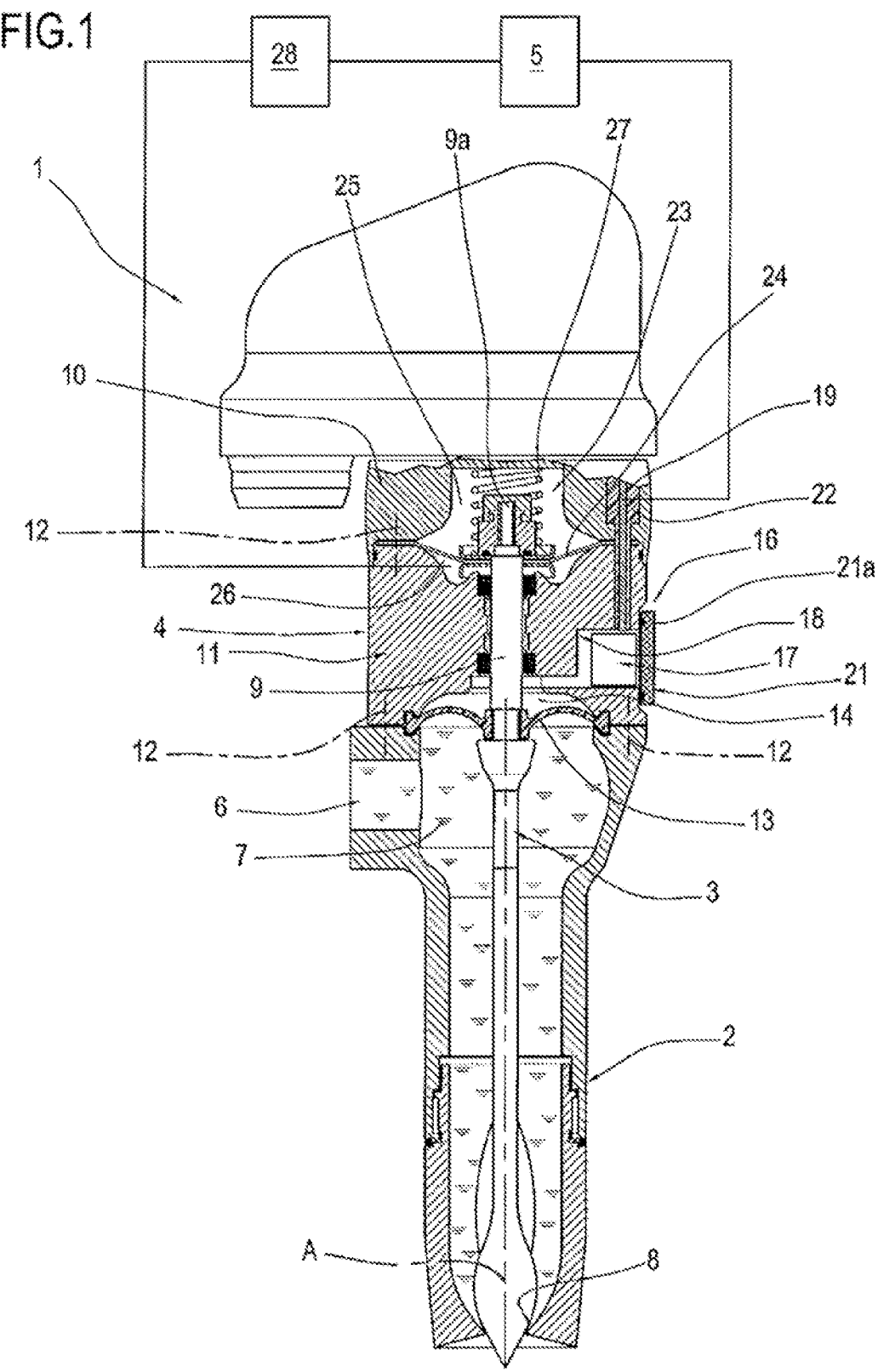
FIG. 1 is a cross section of the dispensing device according to this invention under normal operating conditions.
Figure 2:
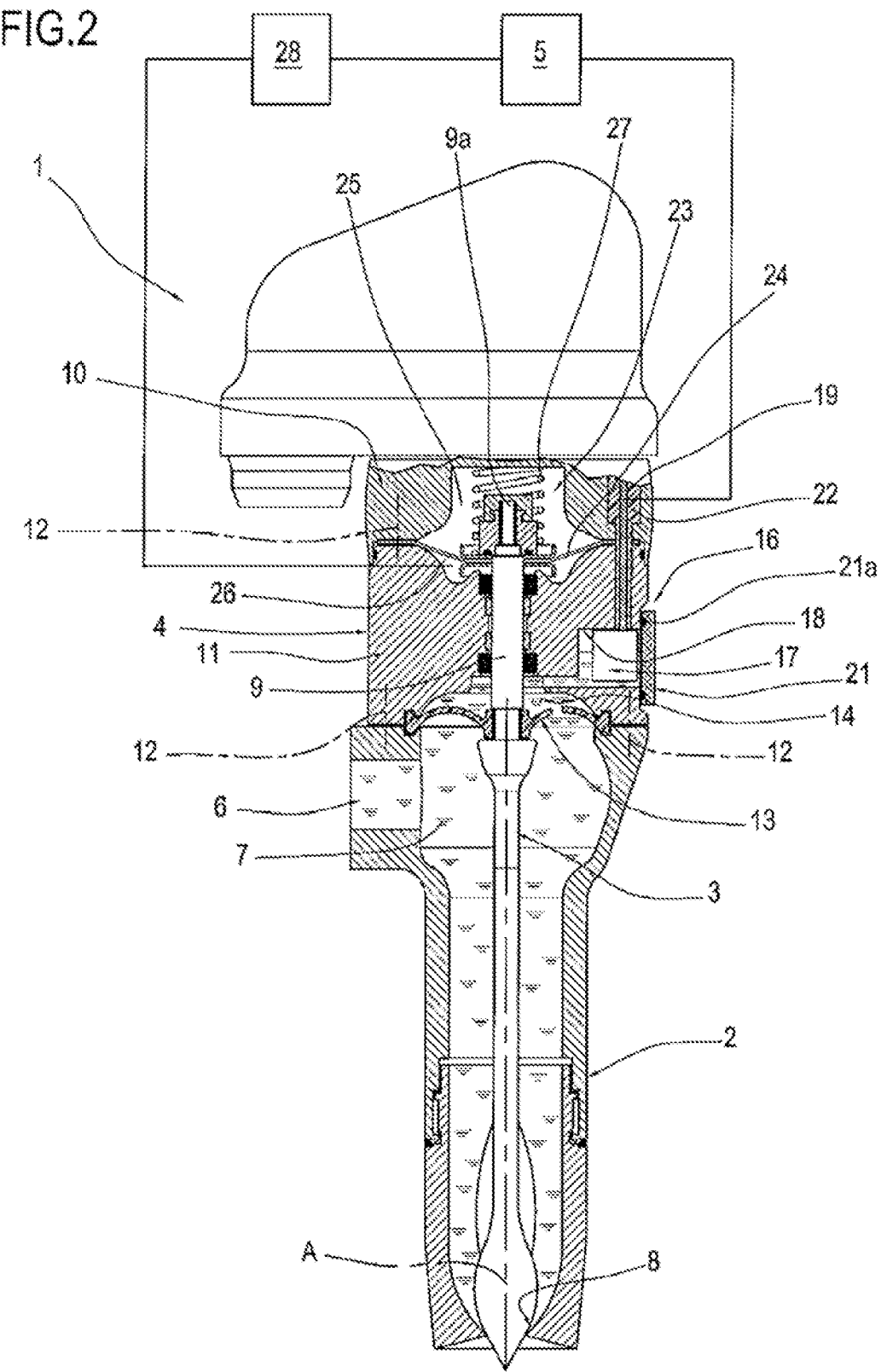
FIG. 2 is a cross section of the dispensing device according to this invention under broken membrane conditions.
Figure 5:
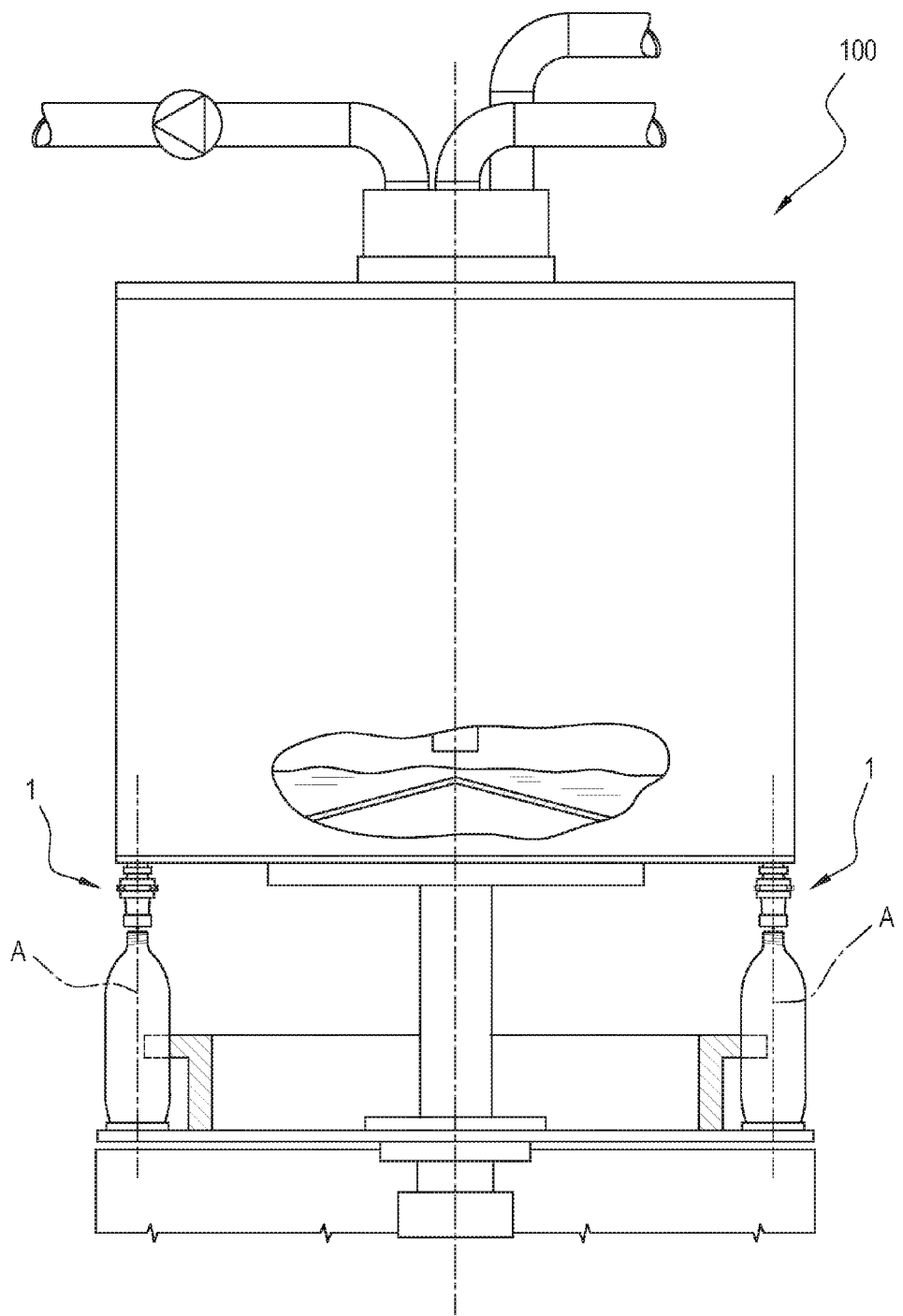
FIG. 5 is a side view of a liquid product filling machine including a plurality of dispensing devices according to FIGS. 1-4.

With reference to FIGS. 1 and 2, the numeral 1 denotes a dispensing device for a liquid product filling machine 100 (see FIG. 5) comprising a plurality of the dispensing devices 1 according to the invention.

The dispensing device 1 comprises a dispensing conduit 2 extending along a vertical axis A and a shutter 3 coaxial with the axis A. An actuating unit 4 moves the shutter 3 along the axis A.

Further, each dispensing device 1 of the filling machine 100, which is further described in publication EP1731478, incorporated herein by reference for completeness of description, comprises a control unit 5 of its own.

The dispensing conduit 2 has an inlet opening 6 for the product 7, made on one side of the dispensing conduit 2. The inlet opening 6 is connected to the outlet conduit, not illustrated, of a containment tank, also not illustrated, for the product 7. Both the outlet conduit and the containment tank are illustrated and described in publication EP1731478.

The dispensing conduit 2 also has a product 7 outlet opening 8. The outlet opening 8 is located at the bottom of the dispensing conduit 2.

The shutter 3 consists of a stem 9 which is coaxial with the axis A.

The actuating unit 4 is adapted to move the shutter 3 along the axis A from a closed position to an open position of the outlet opening 8 and vice versa; More specifically, the actuating unit 4 operates on the stem, 9 of the shutter 3.

The shutter 3 and the inside surface of the conduit 2 are shaped in such a way as to give the product 7 flowing through the outlet opening 8 defined characteristics of shape, speed and pressure.

The actuating unit 4 is defined by an upper member 10 and a lower member 11. The upper member 10 and the lower member 11 are placed over each other and are attached by fastening means 12. Further, the actuating unit 4 is attached to the dispensing conduit 2 by the fastening means 12.

A flexible membrane 13 separates the dispensing conduit 2 from the actuating unit 4. More specifically, the flexible membrane 13 is interposed between the dispensing conduit 2 and the lower member 11.

The membrane 13 is connected to the stem 9 of the shutter 3. The stem 9 goes through the central portion of the selfsame membrane 13.

The actuating unit 4 and the flexible membrane 13 define a sealed chamber 14. The sealed chamber 14 is inside the lower member 11 and is delimited by the membrane 13, by the stem 9 and by sealing elements 15 interposed between the stem 9 and the lower member 11.

The dispensing device 1 comprises a detector 16 for detecting the presence of the product 7 inside the sealed chamber 14. The detector 16 thus indicates when the flexible membrane 13 is broken.

The detector 16 for detecting the presence of the product 7 is connected to the control unit 5 of each dispensing device 1, in such a way as to stop dispensing the product 7 from the dispensing device 1 whose flexible membrane 13 is broken.

The detector 16 for detecting the presence of the product 7 comprises a floating element 17 inside a housing 18 which is in communication with the sealed chamber 14. The detector 16 also comprises a contact element 19 which is in communication with the sealed chamber 14. More specifically, the contact element 19 is partly inserted in the housing 18. In FIGS. 1 and 2, the contact element 19 goes through the upper member 10 and the lower member 11 and into the housing 18.

Preferably, the contact element 19 is an electrical conductor and is isolated from the upper member 10 and from the lower member 11 by an insulating material 22. The contact element 19 is part of an electric circuit and is connected to the control unit 5.

Figure 3:
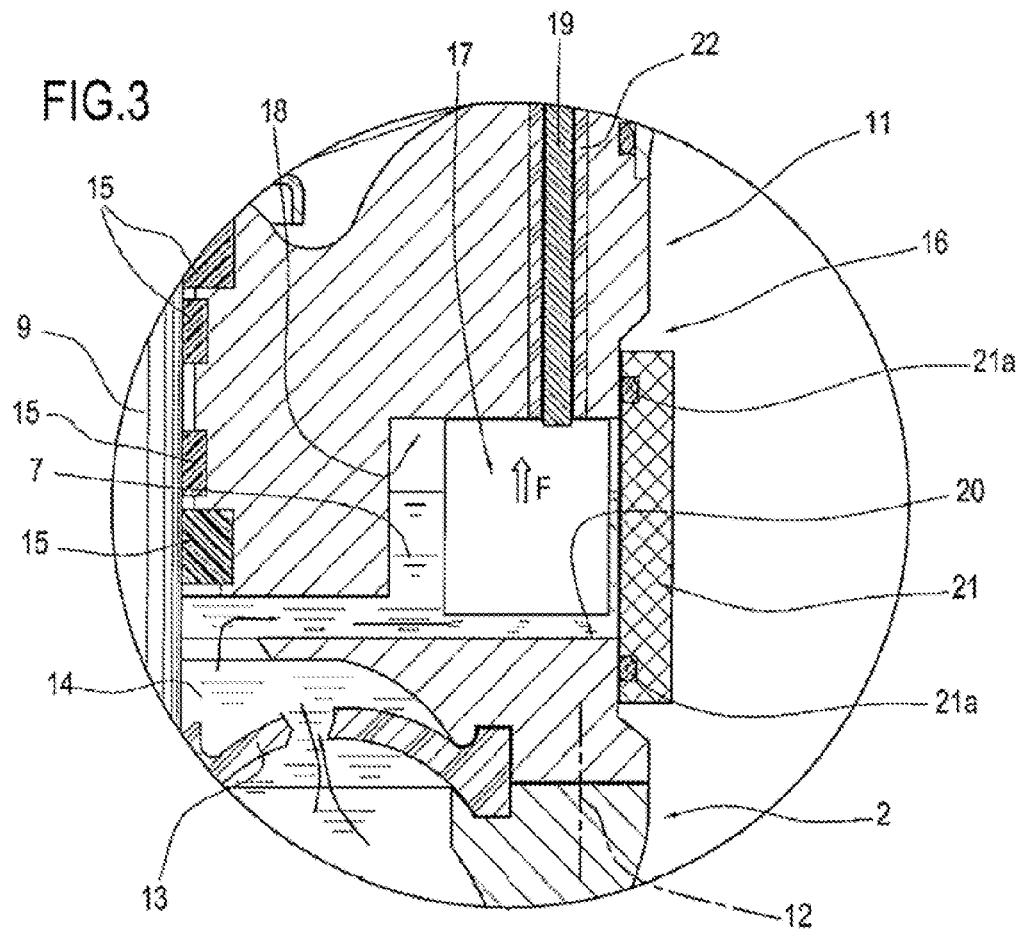
FIG. 3 is a cross section of an enlarged detail of the dispensing device illustrated in FIG. 2.

As illustrated in FIG. 3, a window 20 formed on the outer wall of the lower member 11 places the housing 18 in communication with the outside of the dispensing device 1. The window 20 is closed by a sheet 21 of transparent material allowing visual inspection of the housing 18 with the floating element 17 inside it.

An interposed seal 21a between the sheet 21 and the lower member 11 creates a sealed environment inside the chamber 14 and hence in the housing 18. In effect, the housing 18 forms an integral part of the sealed chamber 14.

The floating element 17 is defined as such because its density is less than the density of the product 7. In the embodiment illustrated, the floating element 17 is cylindrical in shape and may be hollow inside. Preferably, the floating element 17 is made of a conductive material, such as aluminium, for example. In other embodiments not illustrated, the floating element 17 might have any shape and be made of any material, even non-conductive.

The upper member 10 and the lower member 11 are shaped in such a way as to form a compartment 23 when they are attached to each other. An elastically deformable partition 24 is interposed between the upper member 10 and the lower member 11 in such a way as to divide the compartment 23 into a first chamber 25 and a second chamber 26, with variable volume. The upper end 9a of the stem 9 is connected to the central portion of the partition 24. That way, the deformation of the partition 24 causes the shutter 3 to move along the axis A, thereby opening and closing the outlet opening 8. Consequently, the axial movement of the stem 9 causes deformation of the flexible membrane 13 connected to it.

A helical compression spring 27 is wound around the upper end 9a of the stem 9 and tends to keep the shutter 3 in the closed position, as illustrated in FIG. 1.

The second chamber 26 is connected by way of a secondary conduit, not illustrated, to a pressurized fluid unit 28, shown in FIGS. 1 and 2.

The control unit 5 regulates and controls the actuating unit 4. More specifically, the control unit 5 controls the pressurized fluid unit 28 by regulating the fluid flow into and out of the second chamber 26.

The flow of fluid under pressure into the second chamber 26 causes the latter to expand relative to the first chamber 25. Thus, deformation of the partition 24 overcomes the compressive force of the helical spring 27, causing the shutter 3 to move from the closed position to the open position of the outlet opening 8.

The flow of fluid under pressure out of the second chamber 26 causes the latter to contract relative to the first chamber 25. Thus, deformation of the partition 24 combined with the compressive force of the helical spring 27, causes the shutter 3 to move to the closed position of the outlet opening 8. More specifically, the control unit 5 controls the actuating unit 4 in such a way as to move the shutter 3 to the closed position of the outlet opening 8 once the predetermined quantity of product 7 has been filled into the containers, not illustrated.

Under normal operating conditions of the dispensing device 1, the floating element 17 of the detector 16 remains in a first, non-operating position, as illustrated in FIG. 1.

In the first, non-operating position, the floating element 17 does not act in conjunction with the contact element 19. In effect, when the shutter 3 is in the closed position, the flexible membrane 13 prevents the product 7 inside the dispensing conduit 2 from flowing into the sealed chamber 14 and thus from coming into contact with the floating element 17.

When the membrane of the dispensing device 1 breaks, the floating element 17 of the detector 16 moves from the first, non-operating position to a second, operating position.

Figure 4:
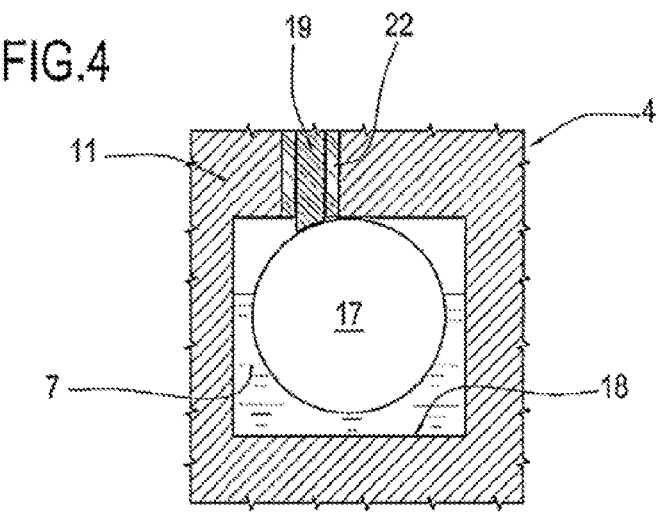
FIG. 4 is a front cross section of a detail of the dispensing device illustrated in FIG. 3.

In effect, when the shutter 3 is in the closed position, the broken flexible membrane 13 allows the product 7 to leak into chamber 14 and thus into the housing 18. At this point, the floating element 17 comes into contact with the product 7, which applies a vertical pushing action on the floating element 17 in the direction indicated by the arrow F in FIG. 3. When the pushing action of the product 7 is greater than the weight force of the floating element 17, the latter tends to rise towards, and float on, the surface of the product 7. When it floats, the floating element 17 comes into contact with the contact element 19 and partly with the upper and/or side wall of the housing 18 (see FIG. 4).

That way, the floating element 17 passes from a first, non-operating position, where it does not act in conjunction with the contact element 19 to a second, operating position where it does act in conjunction with the contact element 19. In the embodiment described, the floating element 17 makes an electrical connection with the contact element 19. It should be noted that in the embodiment described and illustrated (in particular in FIGS. 3 and 4), the floating element 17 comes into contact with the element 19 and must simultaneously come into contact with a point on the upper and/or side wall of the housing 18 in such a way as to make the electrical circuit by shorting with the lower member 11. The closing of the circuit is detected by the control unit 5. In a further embodiment, the joint action of the floating element 17 and the contact element 19 may be of a mechanical type, that is to say, the floating element 17 may exert a slight pressure on the contact element 19 and the latter closes the electrical circuit.

In the second, operating position, the floating element 17 activates the detector 16 for detecting the presence of the product 7. The detector 16 then sends a signal to the control unit 5 in order to switch the shutter 3 to the position where it closes the outlet opening 8.

The control unit 5 controls the actuating unit 4 in order to keep the shutter 3 in the position where it closes the outlet opening 8 until maintenance is carried out on the dispensing device 1 to substitute the broken flexible membrane 13. In the meantime, the filling machine 100 can continue to operate, albeit at partial capacity, since the other dispensing devices 1 it is equipped with continue to operate normally. A visual check through the window 21 shows which of the dispensing devices 1 has product 7 inside the sealed chamber 14.

The dispensing device 1, as described and illustrated, is equipped with a detector 16 for detecting the broken flexible membrane 13 and connected directly to the control unit 5 of each dispensing device 1 so that when the flexible membrane 13 of a dispensing device 1 breaks, it is possible to stop only that dispensing device and not the entire filling machine 100. That means maintenance of the filling machine 100 can be programmed and in the meantime the filling machine 100 can continue to operate at reduced capacity, guaranteeing the quality of the product filled into the containers and thereby limiting machine down time and hence the costs due to non-production. In effect, at the outfeed end of the machine 100, there may be means for detecting the full containers and means for rejecting the containers which are empty because they were located under the dispensing device or devices with the broken membrane and thus not in operation.

One advantage of the dispensing device 1 described above is that it reduces the installation costs of the detector 16 compared to prior art broken membrane detectors. In effect, the product 7 presence detector 16 does not require further electrical and/or electronic connections to a further filling machine control system, since the detector 16 is connected directly to the control unit 5.

Another advantage of the dispensing device 1 described above is that it is simpler to produce and less expensive than prior art devices.

It should be noted that the dispensing device 1 as described herein makes it possible to detect the presence of liquids in the sealed chamber 14 whether the liquids are products to be filled into the containers or products used for cleaning.

Moreover, it should also be noted that if the liquid products concerned have relatively high electrical conductivity, it may be sufficient for the contact element 19 to simply touch the product 7 which reaches the chamber 14.

The contact element 19, which is always live, whatever the embodiment adopted, sends a signal to the control unit 5 when it comes into contact with the product 7, thereby making the electrical circuit by shorting with the lower member 11.

The invention claimed is:

1. A dispensing device for a liquid product filling machine comprising a plurality of the dispensing devices, the dispensing device comprising:
   a dispensing conduit extending along a vertical axis and having a product outlet opening;
   a shutter for the outlet opening coaxial with the axis;
   an actuating unit configured to move the shutter along the axis from a closed position to an open position of the outlet opening and vice versa;
   a flexible membrane which separates the dispensing conduit from the actuating unit and which includes a dispensing conduit side and a reverse side;
   the actuating unit and the flexible membrane defining a sealed chamber isolated from a product in the dispensing conduit with the sealed chamber open to the reverse side of the flexible membrane;
   a detector configured for detecting a presence of the product inside the sealed chamber upon a failure of the flexible membrane and indicating the failure of the flexible membrane;
   a control unit;
   wherein the detector is connected to the control unit in such a way as to stop dispensing the product from the dispensing device when the detector detects presence of the product inside the sealed chamber and indicates failure of the flexible membrane;
   wherein the detector comprises a floating element inside a housing in communication with the sealed chamber and open to the reverse side of the flexible membrane, the floating element isolated from the product until failure of the flexible membrane;

wherein a density of the floating element is less than a density of the product so that the floating element floats in the product;

wherein the detector includes an electrical circuit having an open circuit mode indicating that the flexible membrane is intact and a closed circuit mode indicating a failure of the flexible membrane, the detector including a contact element in communication with the sealed chamber;

wherein the floating element passes from a first, non-operating position where the flexible membrane is intact and the floating element does not act in conjunction with the contact element, to a second, operating position, where there has been a failure of the flexible membrane and the floating element is floating in the product to engage the contact element to become art of and close the electrical circuit of the detector and place the electrical circuit in the closed circuit mode to indicate the failure of the flexible membrane.

2. The dispensing device according to claim 1, wherein the detector for detecting the presence of the product sends a signal to the control unit in order to switch the shutter to the closed position to close the outlet opening.

3. A liquid product filling machine comprising a plurality of the dispensing devices having the detectors of claim 2, the control unit programmed to stop dispensing the product from only the dispensing device where the detector indicates failure of the flexible membrane while continuing to allow dispensing the product from the others of the plurality of the dispensing devices where the detectors have not indicated failures of the flexible membranes.

4. A liquid product filling machine comprising a plurality of the dispensing devices having the detectors of claim 1, the control unit programmed to stop dispensing the product from only the dispensing device where the detector indicates failure of the flexible membrane while continuing to allow dispensing the product from the others of the plurality of the dispensing devices where the detectors have not indicated failures of the flexible membranes.

* * * * *